(12) United States Patent
Karnik et al.

(10) Patent No.: US 6,771,862 B2
(45) Date of Patent: Aug. 3, 2004

(54) SIGNALING MEDIUM AND APPARATUS

(75) Inventors: Tanay Karnik, Portland, OR (US); Jianping Xu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 117 days.

(21) Appl. No.: 09/995,434

(22) Filed: Nov. 27, 2001

(65) Prior Publication Data

US 2003/0099443 A1 May 29, 2003

(51) Int. Cl.$^7$ .................................................. G02B 6/44

(52) U.S. Cl. ........................................................ 385/101

(58) Field of Search .......................................... 385/101

(56) References Cited

U.S. PATENT DOCUMENTS 5,418,878 A * 5/1995 Sass et al. ................... 385/101

* cited by examiner

*Primary Examiner*—Javaid H. Nasri
(74) *Attorney, Agent, or Firm*—Schwegman, Lundberg, Woessner & Kluth, P.A.

(57) ABSTRACT

A signaling medium is disclosed. The signaling medium includes several optical media and electrical conductors arranged such that one or more of the electrical conductors are disposed between the optical media. The medium may be shielded, and may included multiple groupings of electrical conductors and optical media. A connector; a signaling assembly, including a signaling medium and connector; a circuit board; and a signal communication system (including multiple circuit boards and one or more signaling media) are also disclosed.

8 Claims, 5 Drawing Sheets

SIGNALING MEDIUM AND APPARATUS

FIELD OF THE INVENTION

The present invention relates generally to media and apparatus used to carry electrical and optical signals. More particularly, the present invention relates to media, such as cabling, and apparatus, such as connectors, cable assemblies, circuit boards, and systems used for transporting electrical and optical signals from one location to another.

BACKGROUND INFORMATION

High-speed microprocessor systems give rise to the need for high-speed signal interfaces. While microprocessor clock operational speeds now routinely exceed 1 GHz, off-board input/output interfaces typically run at speeds of less than 100 MHz. This limitation exists, in part, due to crosstalk which appears between adjacent electrical channels. While electrical conductors can be spaced apart to reduce the problem somewhat, the loss of circuit board surface area and connection density may not be tolerable in a particular design. Over distance, signal amplitude loss and noise also become a problem.

Optical media may carry signals having modulation frequencies in excess of several GHz without appreciable loss of signal strength or an increase in noise over distance. However, a purely optical interface is often not required for routine interface operations.

Thus, there is a need in the art to provide a flexible signaling medium, including connectors and connector assemblies, which offer both electrical and optical signal connection capability. Such a medium should accommodate low and high bandwidth signals, permitting the designer to trade bandwidth for cost. The medium should also operate to minimize electromagnetic interference between signals.

DESCRIPTION OF THE PREFERRED EMBODIMENTS

Figure 1:
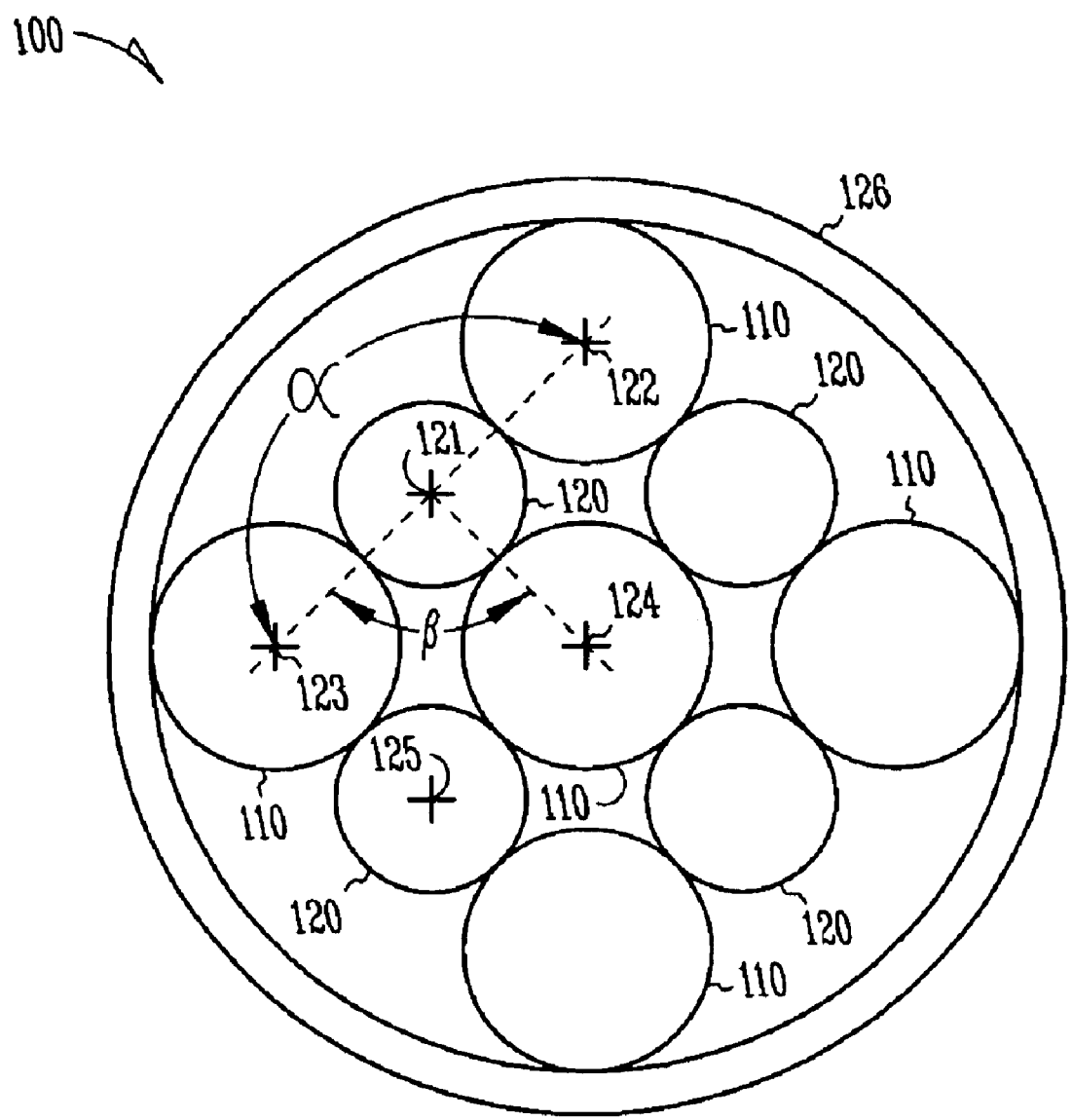
FIG. 1 is an end section view of a signaling medium according to an embodiment of the present invention.

In the following detailed description of the invention, reference is made to the accompanying drawings which form a part hereof, and in which are shown by way of illustration, and not of limitation, specific embodiments in which the invention may be practiced. In the drawings, like numerals describe substantially similar components throughout the several views. The embodiments illustrated herein are described in sufficient detail to enable those skilled in the art to practice the invention. Other embodiments may be utilized and derived therefrom, such that structural, logical, and electrical circuit substitutions and changes may be made without departing from the scope of the invention. The following detailed description, therefore, is not to be taken in a limiting sense, and the scope of the invention is defined only by the appended claims, along with the full range of equivalents to which such claims are entitled.

FIG. 1 is an end section view of a signaling medium according to an embodiment of the present invention. The signaling medium 100 includes a plurality of spaced apart optical signal media 110, and a plurality of electrical signal conductors 120. At least one, and usually several, of the electrical signal conductors 120 is disposed between selected ones of the plurality of optical signal media 110. As used herein, "disposed between" means that the center of a selected electrical signal conductor, along with the center of two selected optical signal media, forms an angle which is between about 50 degrees and about 180 degrees. Thus, for example, the center 121 of one of the electrical signal conductors 120 forms the apex of an angle α, when taken in conjunction with imaginary lines drawn from the center 121 to the centers 122 and 123 of selected optical signal media 110. In this case, the angle α is about 180 degrees. Similarly, the center 121 of one of the electrical signal conductors 120 is located at the apex of an angle β, when taken in conjunction with imaginary lines drawn from the center 121 to the centers 123 and 124 of selected optical signal media 110. In this case, the angle β is about 90 degrees. As a further example, the center 125 of another selected electrical conductor 120 is disposed between the optical signal media 110 having centers 123 and 124. Thus, the electrical signal conductors 120 having centers 121 and 125 are disposed between the optical signal media 110 having centers 123 and 124.

The signaling medium 100 may also include an electrically conductive shield 126 surrounding the optical signal media 110 and the electrical signal conductors 120. To prevent shorting to the electrical signal conductors 120, the shield 126 is typically spaced apart from the electrical signal conductors 120.

Figure 2:
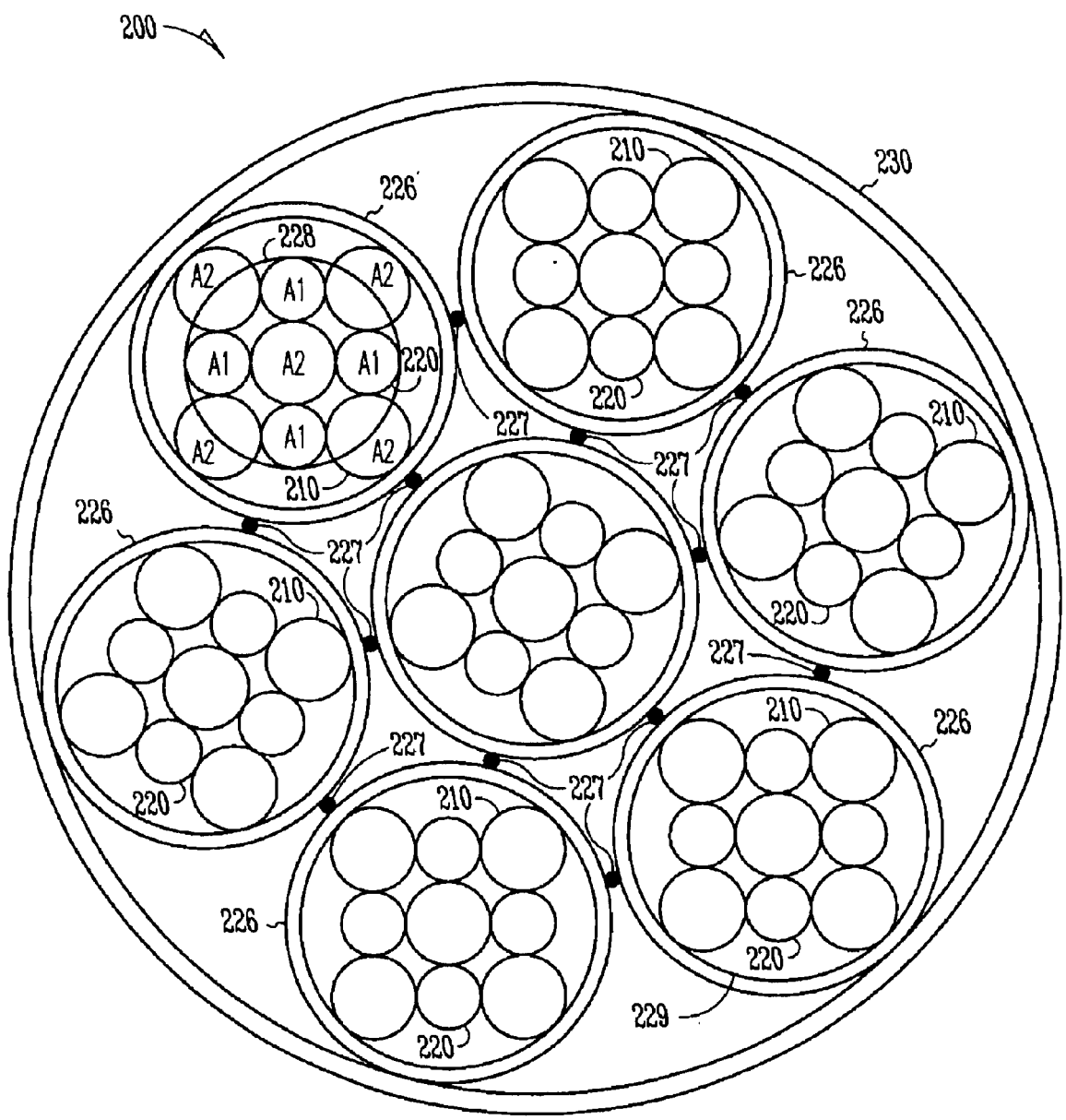
FIG. 2 is an end section view of a signaling medium according to an alternative embodiment of the present invention.

FIG. 2 is an end section view of a signaling medium according to an alternative embodiment of the present invention. In this case, the signaling medium 200 illustrates how several pluralities of optical signal media 210, along with several pluralities of electrical signal conductors 220, might be arranged into groups. Each group includes an electrically conductive shield 226 surrounding one plurality of spaced apart optical signal media 210 and another plurality of electrical signal conductors 220. While each shield 226 is spaced apart from pluralities of electrical signal conductors 220 which it surrounds, each shield 226 in the medium 200 is typically connected or electrically coupled to another shield 226 at some point 227 along its periphery.

Within each shield 226, it can be seen that the electrical signal conductors 220 each have a cross-sectional area A1, while the optical signal media 210 each have a cross-sectional area A2. Typically the medium 200 will be designed so that the cross-sectional area A1 of each one of the electrical signal connectors 220 within a shield 226 grouping will lie within a substantially circular area 228. Similarly, the medium 200 will typically be designed so that the cross-sectional area A2 of each one of the optical signal connectors 210 within a shield 226 grouping will also lie within a substantially circular area 229. If the optical signal media 210 lie toward the outer periphery of each shield 226 grouping, then the diameter of the substantially circular area 228 surrounding the electrical signal conductors 220 will typically be less than the diameter of the substantially circular area 229 surrounding the optical signal media 210. Another electrically conductive shield 230 may be electrically coupled to each of the shields 226, and located so as to surround all of the shield 226 groupings of optical signal media and electrical signal conductors 210, 220.

Figure 3:
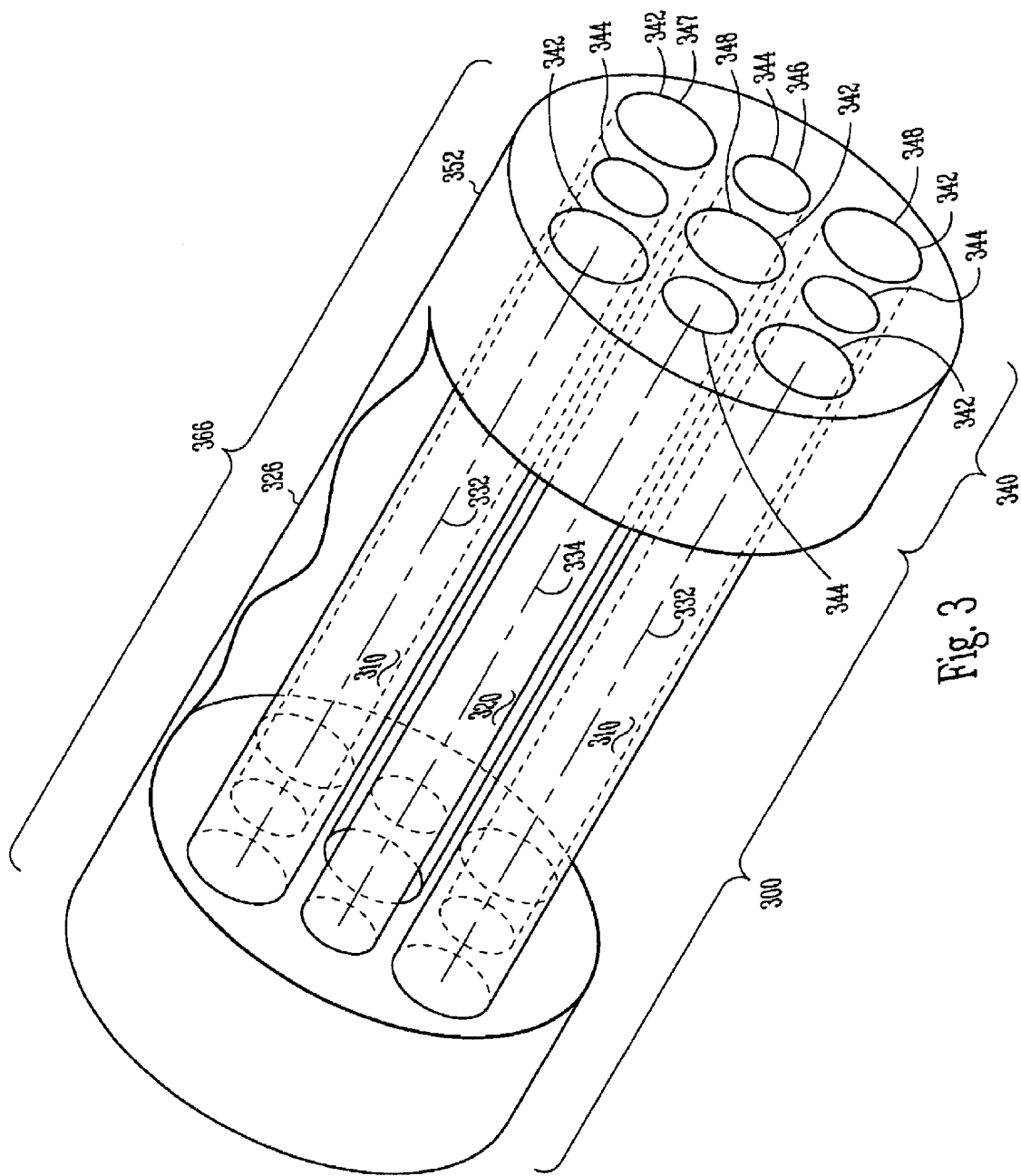
FIG. 3 is a perspective view of a connector and signaling assembly according to another embodiment of the present invention.

Further details regarding construction of the signaling medium of the present invention can be seen in FIG. 3, which is a perspective view of a connector and signaling assembly according to another embodiment of the present invention. In this case, the medium 300 includes a plurality of spaced apart optical signal media 310, each having a longitudinal axis 332, and a plurality of electrical signal conductors 320, each having a longitudinal axis 334. If desired, the medium 300 may be constructed so that the longitudinal axes 332 of each of the optical signal media 310 lie substantially parallel to the longitudinal axis 332 of every other one of the plurality of optical signal media 310. Similarly, the medium 300 may be designed so that the longitudinal axes 334 of each one of the electrical signal conductors 320 lie substantially parallel to the longitudinal axis 334 of every other one of the plurality of electrical signal conductors 320. An electrically conductive shield 326 may be located so as to surround the pluralities of optical signal media and electrical signal conductors 310, 320.

A connector according to yet another embodiment of the invention is also shown in FIG. 3. The connector 340 may include a plurality of spaced apart optical signal terminations 342 and a plurality of electrical signal terminations 344. As is the case with the various types of conductors described with respect to the medium of the invention, the electrical signal terminations 344 may be disposed between selected optical signal terminations 342. For example, the electrical signal termination 346 may be considered to be disposed between the optical signal terminations 347, 348. Alternatively, and simultaneously, the electrical signal termination 346 may also be considered to be disposed between the optical signal terminations 348, 349. The connector 340 may also include an electrically conductive shield termination 352 spaced apart from the plurality of electrical signal terminations 344. Of course, while not explicitly shown in FIG. 3, the connector 340 may also includes several groupings of terminations 342, 344, and multiple shield terminations 352, so as to enable coupling directly to a signaling medium 300, constructed in a fashion which is similar to or identical to the signaling medium 200 shown in FIG. 2. A signaling assembly according to yet another embodiment of the invention is also shown in FIG. 3. The signaling assembly 366 includes a connector 340 coupled to a signaling medium 300, such that one or more pluralities of optical signal media 310, along with one or more pluralities of electrical signal conductors 320, terminate in the connector 340. The board connection for electrical conductors is designed to have a matching termination impedance. One or more electrically conductive shields 326, surrounding one or more corresponding groups of optical signal media and electrical signal conductors 310, 320 may also terminate in the connector 340.

Figure 4:
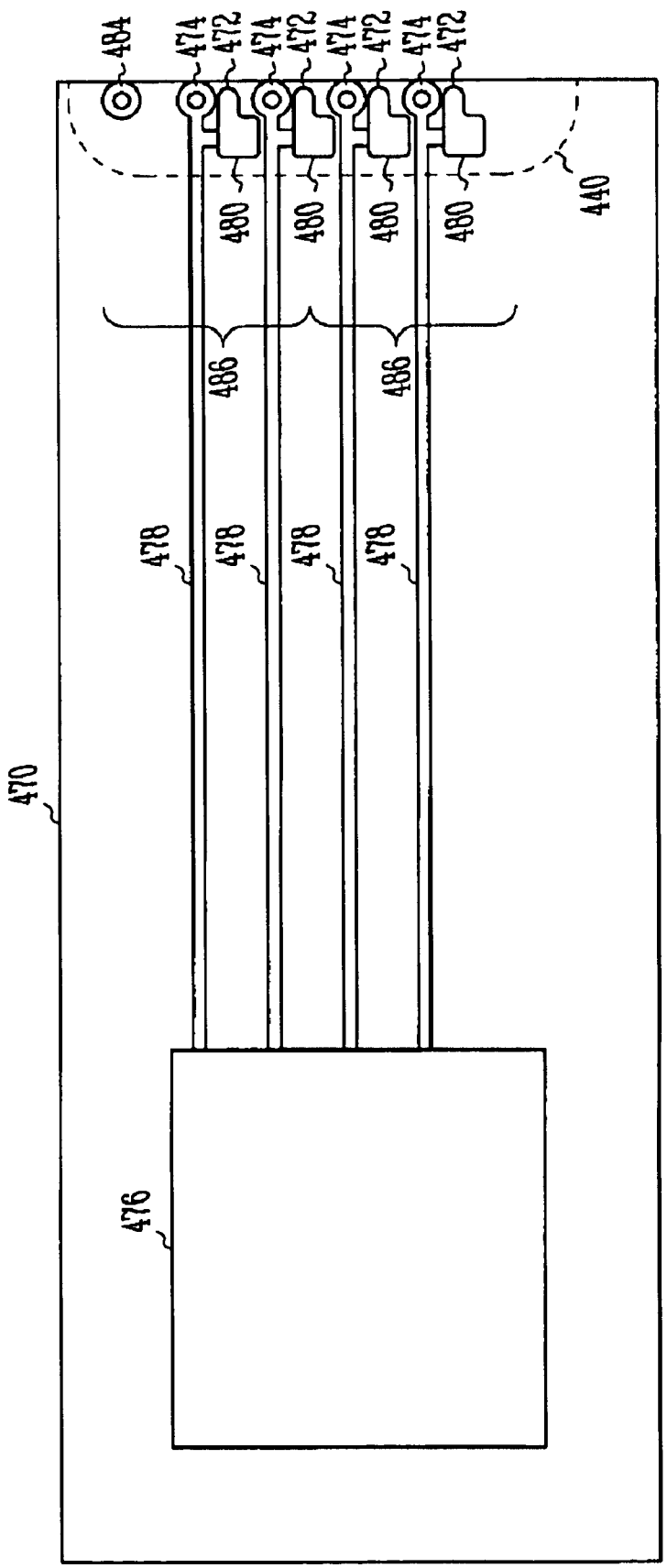
FIG. 4 is a top plan view of a circuit board according to yet another embodiment of the present invention.

FIG. 4 is a top plan view of a circuit board according to another embodiment of the present invention. The circuit board 470 includes a plurality of spaced apart optical signal terminations 472 and a plurality of electrical signal terminations 474. One or more of the plurality of electrical signal terminations 474 may be disposed between selected ones of the plurality of optical signal terminations 472.

As a practical matter, during operation of the circuitry 476 attached to the circuit board 470, such as a microprocessor or other integrated circuit 476, electrical signals produced thereby or received thereat are conducted to and from the terminations 472, 474 using electrical conductors, such as circuit traces 478. The electrical signals may be converted to optical signals, and vice-versa, using one or more optical signal transmitters, receivers, or transceivers 480. For example, the optical signal transceivers 480 may be functionally and/or structurally similar to, or identical to Intel-LightLogic TRN4035 optical transponders, or Alvesta 3200 multi-channel transceivers. In this manner selected electrical signals originating at the circuitry 476, or received by the circuitry 476, may be converted to optical signals by the transceivers 480 for communication with off-board circuitry using the optical signal terminations 472. Alternatively, electrical signals may simply be left in their original state for communication with off-board circuitry using the electrical signal terminations 474. The circuit board 470 may also include a connector 440 in optical communication with the plurality of optical signal terminations 472, and in electrical communication with the plurality of electrical signal terminations 474.

The connector 440 may be similar to or identical to the connector 340 in FIG. 3, and may include an electrically conductive shield termination 484 spaced apart from the plurality of electrical signal terminations 474. In a typical embodiment, the conductive shield may be electrically connected to a ground plane in the circuit board 470, which along with the connector 440, may also include multiple groups of plural optical and electrical signal terminations, along with several electrically conductive shield terminations.

Figure 5:
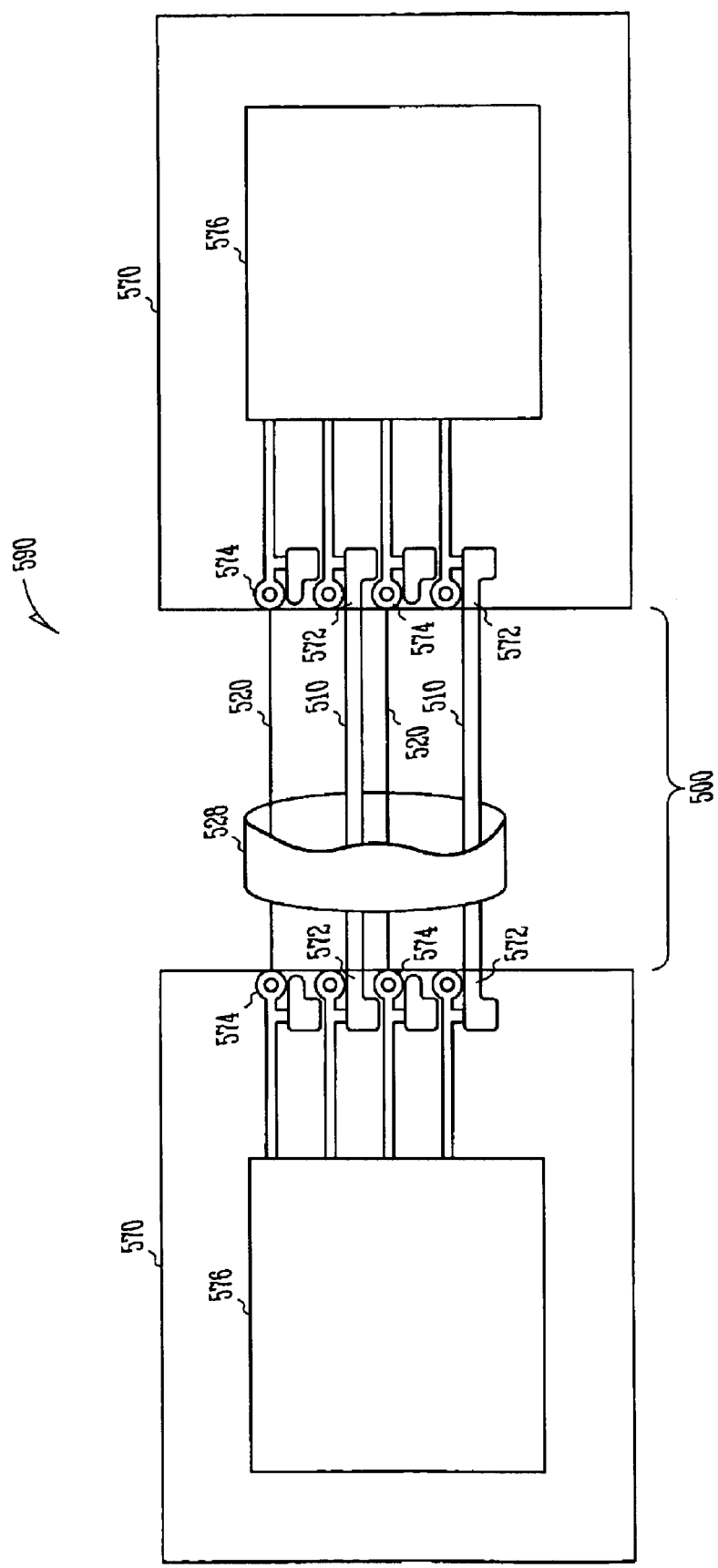
FIG. 5 is a top plan view of a signal communication system according to another alternative embodiment of the present invention.

FIG. 5 is a top plan view of a signal communication system according to another alternative embodiment of the present invention. The signal communication system 590 includes at least two circuit boards 570, each of which may include a plurality of spaced apart optical signal terminations 572 and a plurality of electrical signal terminations 574. One or more of the plurality of electrical signal terminations 574 will typically be disposed between selected ones of the plurality of optical signal terminations 572 on each board 570. The system 590 also includes a signaling medium 500 with one or more pluralities of spaced apart optical signal media 510 capable of being in optical communication with optical signal terminations 572, and one or more pluralities of electrical signal conductors 520 capable of being in electrical communication with the electrical signal terminations 574. Generally, at least one of the electrical signal conductors 520 will be disposed between selected ones of the optical signal media 510. The signal communication system 590 may further include an electrically conductive shield 528 surrounding the optical signal media and electrical signal conductors 510, 520. As noted previously, the conductive shield 528 will typically be spaced apart from the electrical signal conductors 520 to prevent shorting. The system 590 may also include multiple groups of plural optical and electrical signal terminations, along with several electrically conductive shield terminations. The medium 500 may be similar to, or identical to the signaling media 100, 200, and 300 illustrated in FIGS. 1, 2, and 3, respectively.

One of ordinary skill in the art will understand that the media, connectors, connector assemblies, circuit boards, and communications systems of the present invention can be used in other applications, and thus, the invention is not to be so limited. The illustrations of a medium 100, 200, 300, 500; a connector 340, 440; a connector assembly 366; a circuit board 470, 570; and a signal communications system 590 are intended to provide a general understanding of the structure of the present invention, and are not intended to serve as a complete description of all the elements and features of media, connectors, connector assemblies, circuit boards, and communications systems which might make use of the structures described herein.

Applications which may include the novel media, connectors, connector assemblies, circuit board and communications systems of the present invention include electronic circuitry used in high-speed computers, communications ports and other equipment, modems, processor modules, embedded processors, and application-specific modules, including multilayer, multi-chip modules. Such media, connectors, connector assemblies, circuit boards, and communications systems may further be included as subcomponents within a variety of electronic systems, such as televisions, cellular telephones, personal computers, personal radios, automobiles, aircraft, and others.

The signaling media, connectors, connector assemblies, circuit boards, and communications systems of the present invention provide flexibility, offering both electrical and optical signal connection capability. Both high and low bandwidth signals can be accommodated, allowing the designer to trade bandwidth for cost, along with minimizing electromagnetic interference between signals.

Although specific embodiments have been illustrated and described herein, those of ordinary skill in the art will appreciate that any arrangement which is calculated to achieve the same purpose may be substituted for the specific embodiments shown. This disclosure is intended to cover any and all adaptations or variations of the present invention. It is to be understood that the above description has been made in an illustrative fashion, and not a restrictive one. Combinations of the above embodiments, and other embodiments not specifically described herein will be apparent to those of skill in the art upon reviewing the above description. The scope of the invention includes any other applications in which the above structures and methods are used. The scope of the invention should be determined with reference to the appended claims, along with the full range of equivalents to which such claims are entitled.

What is claimed is:

1. A signaling medium, comprising:
   a first plurality of optical signal conductors;
   a first plurality of electrical signal conductors;
   a first electrically conductive shield surrounding the first plurality of optical signal conductors and the first plurality of electrical signal conductors;
   a second plurality of optical signal conductors;
   a second plurality of electrical signal conductors; and
   a second electrically conductive shield surrounding the second plurality of optical signal conductors and the second plurality of electrical signal conductors.

2. The signaling medium of claim 1, wherein the second electrically conductive shield is electrically coupled to the first electrically conductive shield.

3. The signaling medium of claim 1, wherein the first electrically conductive shield surrounding the first plurality of optical signal conductors and the first plurality of electrical signal conductors is spaced apart from the first plurality of electrical signal conductors,
   and wherein the second electrically conductive shield surrounding the second plurality of optical signal conductors and the second plurality of electrical signal conductors is spaced apart from the second plurality of electrical signal conductors.

4. The signaling medium of claim 1, wherein each one of the plurality of optical signal conductors has a longitudinal axis and a cross-sectional area, wherein the longitudinal axis of each one of the plurality of optical signal conductors lies substantially parallel to the longitudinal axis of every other one of the plurality of optical signal conductors, and wherein the cross-sectional area of each one of the plurality of optical signal conductors lies within a first substantially circular area.

5. The signaling medium of claim 4, wherein each one of the plurality of electrical signal conductors has a longitudinal axis and a cross-sectional area, wherein the longitudinal axis of each one of the plurality of electrical signal conductors lies substantially parallel to the longitudinal axis of every other one of the plurality of electrical signal conductors, and wherein the cross-sectional area of each one of the plurality of electrical signal conductors lies within a second substantially circular area.

6. The signaling medium of claim 5, wherein a diameter of the second substantially circular area is less than a diameter of the first substantially circular area.

7. The signaling medium of claim 1, wherein each one of the first plurality of electrical signal conductors is disposed between a selected first one and a selected second one of the first plurality of spaced apart optical signal conductors.

8. A signal communication system, comprising:
   a first circuit board including a first plurality of spaced apart optical signal terminations and a first plurality of electrical signal terminations, wherein at least one of the first plurality of electrical signal terminations is disposed between a selected first one and a selected second one of the first plurality of spaced apart optical signal terminations;
   a second circuit board including a second plurality of spaced apart optical signal terminations and a second plurality of electrical signal terminations, wherein at least one of the second plurality of electrical signal terminations is disposed between a selected first one and a selected second one of the second plurality of spaced apart optical signal terminations;
   a signaling medium including a first plurality of spaced apart optical signal conductors capable of being in optical communication with the first and second plurality of optical signal terminations and a second plurality of electrical signal conductors capable of being in electrical communication with the first and second pluralities of electrical signal terminations, wherein at least one of the first plurality of electrical signal conductors is disposed between a selected first one and a selected second one of the first plurality of spaced apart optical signal conductors;
   a first electrically conductive shield surrounding the first plurality of spaced apart optical signal conductors and the first plurality of electrical signal conductors, and spaced apart from the first plurality of electrical signal conductors;
   a second plurality of spaced apart optical signal conductors;
   a second plurality of electrical signal conductors, wherein at least one of the second plurality of electrical signal conductors is disposed between a selected first one and a selected second one of the second plurality of spaced apart optical signal conductors; and
   a second electrically conductive shield surrounding the second plurality of spaced apart optical signal conductors and the second plurality of electrical signal conductors, the second electrically conductive shield being spaced apart from the second plurality of electrical signal conductors and electrically coupled to the first electrically conductive shield.

* * * * *